C. H. MONROE.
FILTER.
APPLICATION FILED JUNE 14, 1918.

1,304,504.

Patented May 20, 1919.
2 SHEETS—SHEET 1.

Witnesses
J. M. Jester

Inventor
C. H. Monroe
By Victor J. Evans
Attorney

C. H. MONROE.
FILTER.
APPLICATION FILED JUNE 14, 1918.

1,304,504.

Patented May 20, 1919.
2 SHEETS—SHEET 2.

Witnesses
J. M. Jester

Inventor
C. H. Monroe

By Victor J. Evans
Attorney

UNITED STATES PATENT OFFICE.

CHARLES H. MONROE, OF BEELER, KANSAS.

FILTER.

1,304,504.        Specification of Letters Patent.        Patented May 20, 1919.

Application filed June 14, 1918. Serial No. 239,990.

*To all whom it may concern:*

Be it known that I, CHARLES H. MONROE, a citizen of the United States, residing at Beeler, in the county of Ness and State of Kansas, have invented new and useful Improvements in Filters, of which the following is a specification.

This invention relates to filtering devices, particularly to filtering devices for gasolene, and has for its object the provision of a device adapted to be interposed between the gasolene tank and the carbureter of a motor vehicle, whereby the gasolene passing therethrough will be automatically and continuously strained so that sediment therein will be removed and may be drained from the device in order to prevent its entry into the carbureter.

An important object is the provision of a device of this character which is provided with a cut-off cock so that the flow of gasolene may be discontinued while the sediment is drained from the filter, an auxiliary air admission device being associated with the filter to facilitate the withdrawal of the sediment.

A further object is the provision of a device of this character which will be extremely simple and inexpensive in manufacture, which is composed of such few parts that liability of derangement will be reduced to the minimum, which will be efficient and durable in service, and a general improvement of the art.

With the above and other objects and advantages in view, the invention consists in the details of construction to be hereinafter more fully described and claimed, and illustrated in the accompanying drawings, in which:

Figure 1:
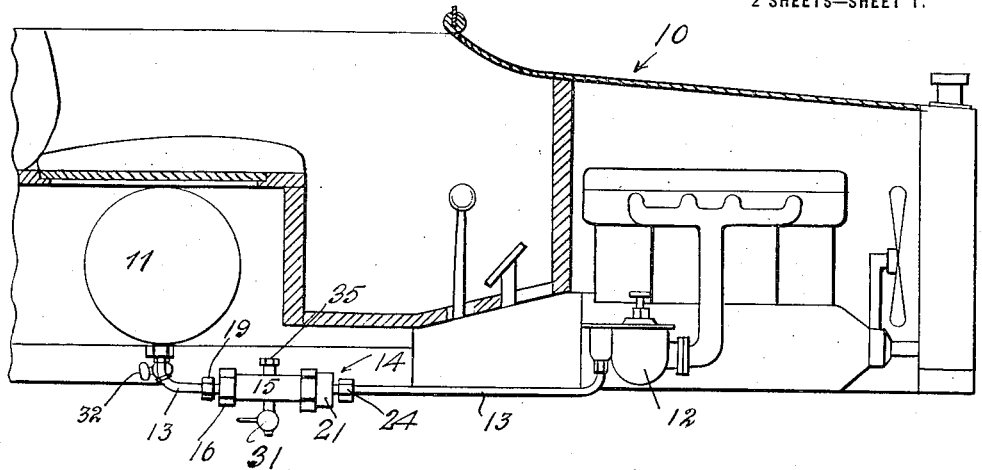
Figure 1 is a fragmentary view of a motor vehicle having my filter interposed in the gasolene line.
Figure 2:
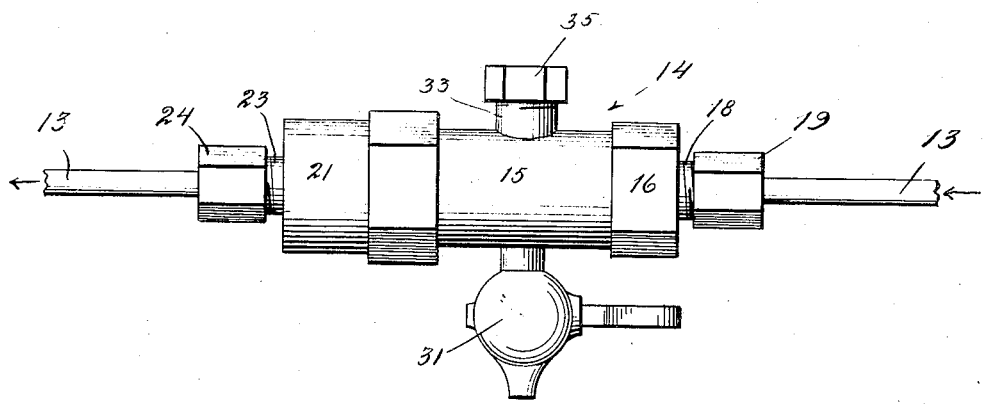
Fig. 2 is a side elevation of the filter detached and on an enlarged scale.
Figure 5:
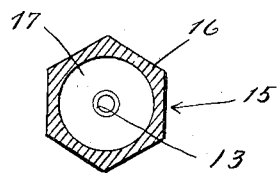
Fig. 5 is a cross sectional view on the line 5—5 of Fig. 3.
Figure 3:
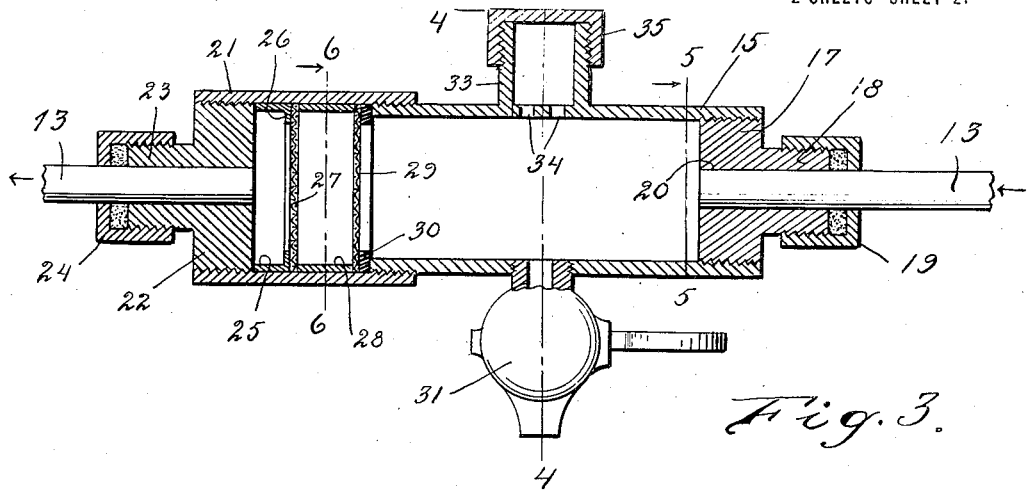
Fig. 3 is a vertical longitudinal sectional view therethrough.
Figure 4:
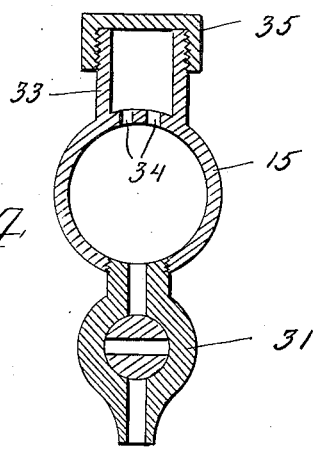
Fig. 4 is a cross sectional view on the line 4—4 of Fig. 3.
Figure 6:
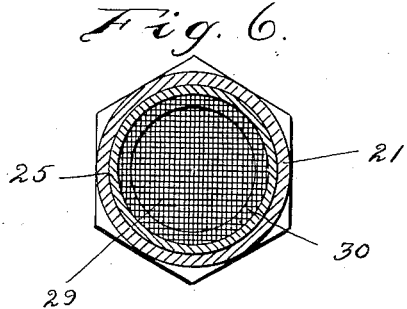
Fig. 6 is a cross sectional view on the line 6—6 of Fig. 3.

Referring more particularly to the drawings, the numeral 10 designates a portion of an automobile within which is disposed a gasolene tank 11 which communicates with the carbureter 12 through a pipe 13.

In carrying out my invention I provide a filter designated broadly by the numeral 14, interposed in the gasolene pipe 13. This filter device includes a cylindrical body portion 15 which has one end provided with angular faces 16 whereby a wrench may be conveniently engaged therewith and which has the same end internally threaded, as shown, for the engagement therein of a plug 17 closing the end and provided with a threaded extension 18 for engagement of a nipple 19 whereby one portion of the gasolene pipe 13 may be secured within the opening 20 in the plug 17. The other end of the tubular body 15 is externally threaded for engagement within the internally threaded end of a tubular member 21 which has its outer end closed by a threaded plug 22 having a cylindrical extension 23 externally threaded for engagement of a nipple 24 disposed upon the other portion of the gasolene pipe 13 which extends through the plug 22. The member 21 is also provided with angular faces 24 to facilitate engagement therewith of a wrench. The members 15 and 21 when thus assembled form a cylindrical chamber within which is disposed filtering means to be described.

Disposed within the member 21 and abutting against the plug 22 is a sleeve member 25 having a flange 26 against which abuts a screen 27 of wire gauze cut to conform to the configuration of the member 21. A second sleeve member 28 is disposed within the member 21 and has one end abutting against the screen 27 and has its other end engaged by a second screen 29 which has disposed thereagainst a packing gasket 30 of suitable material. When the member 15 is screwed into the member 21 its end will engage against the gasket 30 and hold the sleeve members 26 and 28 and the screens 27 and 29 firmly in position so that displacement thereof will be prevented. A gasket 30 forms a leak-proof joint so that the device will be gasolene tight.

A drain cock 31 is screwed into an opening at substantially the center of the tubular member 15 whereby accumulations of sediment or water within the device may be removed from time to time as will be necessary.

In order that the flow of gasolene through the pipe 13 may be shut off when it is desired to drain the filter, I provide a cock 32 disposed within the pipe 13 between the filter and gasolene tank.

In order to facilitate draining of the sediment, I provide air admitting means including an upwardly extending tubular member 33 upon the member 15 diametrically opposite to the cock 31 and provide the wall of the member 15 within the member 33 with air admitting openings 34. Normally, the open end of the member 33 is closed by a threaded cap 35.

When it is desired or necessary to drain the sediment from the filter, it is merely necessary to close the cock 32, remove the cap 35 to permit air to enter the filter and then open the cock 31. Any undesirable accumulations within the filter restrained from passage therethrough by the screen 29 will then flow out of the filter through the cock 31 in an obvious manner. If necessary the device may be dis-assembled and the screens 27 and 29 removed and cleaned. It is understood of course that the air admission openings 34 permit air to enter the filter to take the place of the sediment removed so that there will be no vacuum forming tendency to hinder the discharge of the matter withdrawn. After the accumulations have been removed, the cap 35 is restored to place, the cock 31 closed and the cock 32 opened, whereupon gasolene will pass through the filter in the usual manner as before.

From the foregoing description and a study of the drawings it will be apparent that I have thus provided a device which may be readily and cheaply attached to the gasolene line of an automobile whereby the gasolene will be continuously strained in its flow from the tank to the carbureter.

Having thus described the invention what is claimed is:

A device of the character described comprising a pair of horizontally disposed tubular members threaded together, plugs threaded into and closing the outer ends of said members and provided with openings, a gasolene inlet pipe disposed in one of said openings, a gasolene outlet pipe disposed in the other of said openings, a pair of screens disposed within one of said tubular members, spacing sleeves disposed between said screens and between one of said screens and the adjacent plug for holding said screens in spaced relation to each other and to the adjacent plug, the end of the other tubular member holding said screens and said sleeves in clamping relation, said screens defining within said tubular members, a primary, secondary and tertiary sediment chamber, said primary sediment chamber being relatively large, a drain cock connected with one of said tubular members, and communicating with said primary sediment chamber, a tubular extension on one of said members communicating with said primary sediment chamber, and a closure cap secured upon said tubular extension.

In testimony whereof I affix my signature.

CHARLES H. MONROE.